(12) United States Patent
Moroguchi et al.

(10) Patent No.: US 12,552,719 B2
(45) Date of Patent: Feb. 17, 2026

(54) CUBIC BORON NITRIDE SINTERED MATERIAL

(71) Applicants: SUMITOMO ELECTRIC HARDMETAL CORP., Hyogo (JP); SUMITOMO ELECTRIC INDUSTRIES, LTD., Osaka (JP)

(72) Inventors: Hironari Moroguchi, Hyogo (JP); Yuki Tsutsumiuchi, Hyogo (JP); Michiko Matsukawa, Hyogo (JP); Akihiko Ueda, Hyogo (JP); Satoru Kukino, Osaka (JP)

(73) Assignees: SUMITOMO ELECTRIC HARDMETAL CORP., Hyogo (JP); Sumitomo Electric Industries, Ltd., Osaka (JP)

( * ) Notice: Subject to any disclaimer, the term of this patent is extended or adjusted under 35 U.S.C. 154(b) by 704 days.

(21) Appl. No.: 17/789,504

(22) PCT Filed: Oct. 1, 2021

(86) PCT No.: PCT/JP2021/036415
§ 371 (c)(1),
(2) Date: Jun. 27, 2022

(87) PCT Pub. No.: WO2023/053441
PCT Pub. Date: Apr. 6, 2023

(65) Prior Publication Data
US 2024/0174576 A1    May 30, 2024

(51) Int. Cl.
*C04B 35/5831* (2006.01)
*B23B 27/14* (2006.01)
*C22C 26/00* (2006.01)

(52) U.S. Cl.
CPC .......... *C04B 35/5831* (2013.01); *B23B 27/14* (2013.01); *B23B 2222/28* (2013.01); *C04B 2235/386* (2013.01); *C04B 2235/3865* (2013.01); *C22C 26/00* (2013.01)

(58) Field of Classification Search
CPC ................. C22C 26/00; B23B 27/14
See application file for complete search history.

(56) References Cited

U.S. PATENT DOCUMENTS

| | | | |
|---|---|---|---|
| 5,948,716 A | 9/1999 | Kume et al. | |
| 2005/0210755 A1* | 9/2005 | Cho | B23P 15/28 51/293 |
| 2009/0120011 A1 | 5/2009 | Okamura et al. | |
| 2011/0176879 A1* | 7/2011 | Jonker | C22C 26/00 156/60 |
| 2011/0226532 A1* | 9/2011 | Jonker | B24D 3/10 175/428 |
| 2016/0052827 A1 | 2/2016 | Matsuda et al. | |
| 2017/0266733 A1 | 9/2017 | Sato et al. | |
| 2018/0117678 A1* | 5/2018 | Takahama | C04B 41/87 |
| 2021/0213539 A1 | 7/2021 | Iida et al. | |

FOREIGN PATENT DOCUMENTS

| | | |
|---|---|---|
| CN | 104668597 A | 6/2015 |
| CN | 106316404 A | 1/2017 |
| JP | 10-182234 A | 7/1998 |
| JP | 2014-198637 A | 10/2014 |
| JP | 2016-107396 A | 6/2016 |
| JP | 2016-528132 A | 9/2016 |
| WO | 2007/010670 A1 | 1/2007 |
| WO | 2014/191567 A1 | 12/2014 |
| WO | 2021/024737 A1 | 2/2021 |

OTHER PUBLICATIONS

Klimczyk, P. et al. "Al2O3—cBN composites sintered by SPS and HPHT methods". Journal of the European Ceramic Society. vol. 36, Issue 7 pp. 1783-1789 (Year: 2016).*

* cited by examiner

Primary Examiner — Alexandra M Moore
(74) Attorney, Agent, or Firm — Renner, Otto, Boisselle & Sklar, LLP (57) ABSTRACT

A cubic boron nitride sintered material comprising cubic boron nitride grains and a binder, in which a content of the cubic boron nitride grains is no less than 30% by volume and no more than 80% by volume, the binder includes at least one selected from a second group consisting of a material made of a single element selected from a first group consisting of a group 4 element, a group 5 element and a group 6 element of the periodic table, aluminum, silicon, iron, cobalt and nickel, and an alloy and an intermetallic compound each composed of no less than two elements selected from the first group, and a content of a void in the cubic boron nitride sintered material is no less than 0.001% by volume and no more than 0.20% by volume.

7 Claims, 1 Drawing Sheet

CUBIC BORON NITRIDE SINTERED MATERIAL

TECHNICAL FIELD

The present disclosure relates to a cubic boron nitride sintered material.

BACKGROUND ART

High hardness materials for use in cutting tools or the like include a cubic boron nitride sintered material (Hereinafter, also each referred to as "cBN sintered material".) (PTL 1 and PTL 2).

CITATION LIST

Patent Literature

PTL 1: Japanese Patent Laying-Open No. 2016-107396
PTL 2: WO 2007/010670

SUMMARY OF INVENTION

The present disclosure provides a cubic boron nitride sintered material comprising cubic boron nitride grains and a binder, wherein
a content of the cubic boron nitride grains in the cubic boron nitride sintered material is no less than 30% by volume and no more than 80% by volume,
the binder includes
at least one selected from a second group consisting of a material made of a single element selected from a first group consisting of a group 4 element, a group 5 element and a group 6 element of the periodic table, aluminum, silicon, iron, cobalt and nickel, and an alloy and an intermetallic compound each composed of no less than two elements selected from the first group, and/or
at least one selected from a fourth group consisting of a compound composed of at least one element selected from the first group and at least one element selected from a third group consisting of nitrogen, carbon, boron and oxygen, and a solid solution of the compound, and
a content of a void in the cubic boron nitride sintered material is no less than 0.001% by volume and no more than 0.20% by volume.

DETAILED DESCRIPTION

Problem to be Solved by the Present Disclosure

In recent years, a need for high-efficiency processing has been increased. When high-efficiency processing is performed with a tool using cubic boron nitride, a shortened tool life may be caused by fracture. Therefore, a cubic boron nitride sintered material is demanded in which, when the cubic boron nitride sintered material is used as a material for a tool, the tool can have a long tool life even in high-efficiency processing.

An object of the present disclosure is then to provide a cubic boron nitride sintered material in which, when the cubic boron nitride sintered material is used as a material for a tool, the tool can have a long tool life even in high-efficiency processing.

Advantageous Effect of the Present Disclosure

When the presently disclosed cubic boron nitride sintered material is used as a material for a tool, the tool can have a long tool life even in high-efficiency processing.

DESCRIPTION OF EMBODIMENTS

First, embodiments of the present disclosure will be listed and described.

(1) The present disclosure provides a cubic boron nitride sintered material comprising cubic boron nitride grains and a binder, wherein
the content of the cubic boron nitride grains in the cubic boron nitride sintered material is no less than 30% by volume and no more than 80% by volume,
the binder includes
at least one selected from a second group consisting of a material made of a single element selected from a first group consisting of a group 4 element, a group 5 element and a group 6 element of the periodic table, aluminum, silicon, iron, cobalt and nickel, and an alloy and an intermetallic compound each composed of no less than two elements selected from the first group, and/or
at least one selected from a fourth group consisting of a compound composed of at least one element selected from the first group and at least one element selected from a third group consisting of nitrogen, carbon, boron and oxygen, and a solid solution of the compound, and
the content of a void in the cubic boron nitride sintered material is no less than 0.001% by volume and no more than 0.20% by volume.

When the presently disclosed cubic boron nitride sintered material is used as a material for a tool, the tool can have a long tool life even in high-efficiency processing.

(2) The average equivalent circular diameter of the void is preferably no less than 3 nm and no more than 60 nm. This leads to a further enhancement in tool life.

(3) The cubic boron nitride sintered material includes a plurality of the voids, and
the average distance between the voids is preferably no less than 1.5 μm and no more than 15 μm. This leads to a further enhancement in tool life.

(4) The content of the cubic boron nitride grains in the cubic boron nitride sintered material is preferably no less than 40% by volume and no more than 75% by volume. This leads to a further enhancement in tool life.

Detailed Description of Embodiments of the Present Disclosure

Specific examples of the presently disclosed cubic boron nitride sintered material will be described with reference to the drawing. The same reference symbol in the drawing in the present disclosure represents the same section or any corresponding section thereof.

The designation "A to B" regarding a numerical range herein means to include the upper limit and the lower limit of the range (namely, no less than A and no more than B), and when no unit is designated with A and any unit is designated with only B, the unit of A is the same as the unit of B.

When a compound or the like is herein represented by a chemical formula, the atomic ratio thereof, if not particularly limited, encompasses any atomic ratio conventionally known, and should not be necessarily limited to only any stoichiometric range. For example, when "TiAlN" is designated, the ratio among the numbers of atoms constituting TiAlN encompasses any atomic ratio conventionally known.

Embodiment 1: Cubic Boron Nitride Sintered Material

A cubic boron nitride sintered material of one embodiment of the present disclosure (hereinafter, also referred to as "the present embodiment") is a cubic boron nitride sintered material comprising cubic boron nitride grains and a binder, wherein
the content of the cubic boron nitride grains in the cubic boron nitride sintered material is no less than 30% by volume and no more than 80% by volume,
the binder includes
at least one selected from a second group consisting of a material made of a single element selected from a first group consisting of a group 4 element, a group 5 element and a group 6 element of the periodic table, aluminum, silicon, iron, cobalt and nickel, and an alloy and an intermetallic compound each composed of no less than two elements selected from the first group, and/or
at least one selected from a fourth group consisting of a compound composed of at least one element selected from the first group and at least one element selected from a third group consisting of nitrogen, carbon, boron and oxygen, and a solid solution of the compound, and
the content of a void in the cubic boron nitride sintered material is no less than 0.001% by volume and no more than 0.20% by volume.

When the cubic boron nitride sintered material of the present embodiment is used as a material for a tool, the tool can have a long tool life even in high-efficiency processing. The reason for this is presumed as the following (i) to (iii).
(i) The cubic boron nitride sintered material of the present embodiment includes no less than 30% by volume and no more than 80% by volume of cubic boron nitride grains having excellent strength and toughness. Thus, the cubic boron nitride sintered material can also have excellent strength and toughness. Accordingly, the cubic boron nitride sintered material can have excellent wear resistance and fracture resistance, and a tool using the cubic boron nitride sintered material can have a long tool life.
(ii) The binder included in the cubic boron nitride sintered material of the present embodiment is particularly high in force to bind to the cubic boron nitride grains. Accordingly, the cubic boron nitride sintered material can have excellent wear resistance and fracture resistance, and a tool using the cubic boron nitride sintered material can have a long tool life.
(iii) When a tool using the cubic boron nitride sintered material is used for high-efficiency processing, the cutting edge temperature is higher. The cubic boron nitride grains and the binder are different in thermal expansion coefficient, and thus a thermal cycle causes cracking to easily occur and causes fracture to be easily generated. When a void is present in the cubic boron nitride sintered material, the void absorbs the difference in thermal expansion coefficient between the cubic boron nitride grains and the binder, and thus the occurrence of cracking is suppressed. In this regard, a too high content of the void in the cubic boron nitride sintered material tends to cause the void by itself to serve as the point of origin of cracking.

When the content of the void in the cubic boron nitride sintered material is no less than 0.001% by volume and no more than 0.20% by volume, not only the effect of absorbing the difference in thermal expansion coefficient by the void is obtained, but also the void by itself can be inhibited from serving as the point of origin of cracking. In other words, when the content of the void in the cubic boron nitride sintered material is no less than 0.001% by volume and no more than 0.20% by volume, the occurrence of cracking is effectively suppressed. Therefore, a tool using the cubic boron nitride sintered material of the present embodiment in which the content of the void is no less than 0.001% by volume and no more than 0.20% by volume can be excellent in fracture resistance and can have a long tool life. This is a finding newly found by the present inventors.

<Contents of Cubic Boron Nitride Grains, Void and Binder>

The cubic boron nitride sintered material of the present embodiment comprises no less than 30% by volume and no more than 80% by volume of the cubic boron nitride grains, and the binder. The cubic boron nitride sintered material of the present embodiment can be composed of the cubic boron nitride grains and the binder. The cubic boron nitride sintered material can include inevitable impurities due to raw materials, manufacturing conditions, and the like which are used. The content (% by mass) of inevitable impurities in the cubic boron nitride sintered material can be no more than 1% by mass. The cubic boron nitride sintered material of the present embodiment can be composed of the cubic boron nitride grains, the binder, and inevitable impurities.

The lower limit of the content of the cubic boron nitride grains in the cubic boron nitride sintered material is no less than 30% by volume, preferably no less than 40% by volume, more preferably no less than 50% by volume from the viewpoint of enhancements in strength and toughness. The upper limit of the content of the cubic boron nitride grains in the cubic boron nitride sintered material is no more than 80% by volume, preferably no more than 78% by volume, preferably no more than 75% by volume from the viewpoint of enhancements in wear resistance and fracture resistance. The content of the cubic boron nitride grains in the cubic boron nitride sintered material is no less than 30% by volume and no more than 80% by volume, preferably no less than 40% by volume and no more than 78% by volume, further preferably no less than 50% by volume and no more than 75% by volume.

The content of the void in the cubic boron nitride sintered material is no less than 0.001% by volume and no more than 0.20% by volume. The lower limit of the content of the void in the cubic boron nitride sintered material is no less than 0.001% by volume, preferably no less than 0.01% by volume, preferably no less than 0.03% by volume from the viewpoint that the effect of absorbing the difference in thermal expansion coefficient between the cubic boron nitride grains and the binder is obtained. The upper limit of the content of the void in the cubic boron nitride sintered material is no more than 0.20% by volume, preferably no more than 0.11% by volume, preferably no more than 0.09% by volume from the viewpoint that the void is inhibited from serving as the point of origin of cracking. The content of the void in the cubic boron nitride sintered material is no less than 0.001% by volume and no more than 0.20% by volume, preferably no less than 0.01% by volume and no more than 0.11% by volume, preferably no less than 0.03% by volume and no more than 0.09% by volume.

The volume of the entire cubic boron nitride sintered material of the present embodiment can be defined as the total of the volumes of the cubic boron nitride grains, the binder and the void. Accordingly, the content (% by volume) of the binder in the cubic boron nitride sintered material can be a value obtained by subtracting the content (% by volume) of the cubic boron nitride grains and the content (% by volume) of the void from the entire cubic boron nitride sintered material (100% by volume). For example, when the content of the cubic boron nitride grains is 70% by volume and the content of the void is 0.01% by volume, the content of the binder is 29.99% by volume.

The content (% by volume) of the cubic boron nitride grains, the content (% by volume) of the void and the content (% by volume) of the binder in the cubic boron nitride sintered material are measured according to the following method.

(A1) The cubic boron nitride sintered material is cut at a desired part to produce a sample including a cross section of the cubic boron nitride sintered material. The cross section can be produced using a focused ion beam device, a cross section polisher, or the like.

Figure 1:
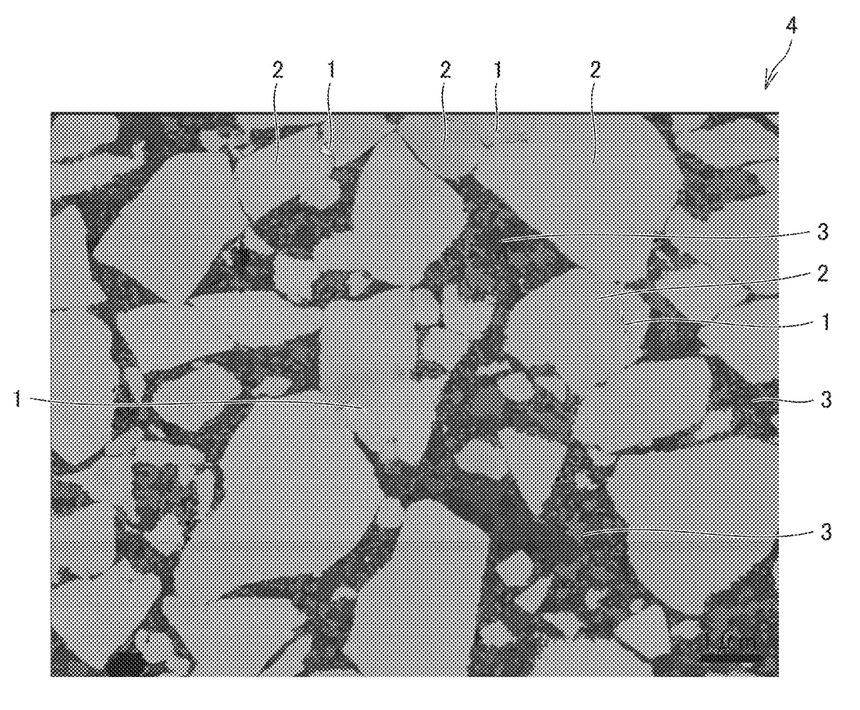
FIG. 1 is a backscattered electron image of a cubic boron nitride sintered material according to Embodiment 1.

(B1) Next, the cross section is observed with SEM at a magnification of 10000×, and a backscattered electron image and a secondary electron image are obtained. The observation magnification is 10000×, and thus the void in the cubic boron nitride sintered material can be clearly determined. In the backscattered electron image, a region where the void is present is a black region, a region where the cubic boron nitride grains are present is a dark gray region, and a region where the binder is present is a light gray region or a white region. In the secondary electron image, the region where the void is present is a concave region. The black region (region where the void is present) in the backscattered electron image and the concave region (region where the void is present) in the secondary electron image are collated to thereby allow for determination of the region where the void is present in the backscattered electron image.

FIG. 1 shows a backscattered electron image of the cubic boron nitride sintered material of the present embodiment. In FIG. 1, a black region indicated by a symbol 1 corresponds to the void. In FIG. 1, a dark gray region indicated by a symbol 2 corresponds to each of the cubic boron nitride grains and a light gray region or a white region indicated by a symbol 3 corresponds to the binder.

(C1) Next, the backscattered electron image is first binarized with image analysis software ("WinROOF" from Mitani Corporation). When the backscattered electron image is taken in the first binarization, the image brightness value is divided to 256 (low brightness: 0, high brightness: 255) and the brightness value of the region where the void is present and the brightness value of the region where the cubic boron nitride grains are present, each determined above, are respectively set in the ranges of no less than 0 and no more than 30 and of more than 30. Thus, the region where the void is present can be extracted. A measurement region of 12 μm×9 μm is arbitrarily set in the image first binarized. The area ratio of the region where the void is present, in the measurement region, is calculated. The area ratio calculated can be estimated in terms of % by volume, and thus the content (% by volume) of the void in the cubic boron nitride sintered material can be determined. When the threshold is set with the first binarization, no variation in content of the void occurs as long as the same field of view is measured.

(D1) Next, the backscattered electron image is second binarized with the image analysis software under conditions set in advance with respect to the image analysis software. A pixel assigned to a bright field in the image second binarized represents the region where the binder is present. In other words, the region where the binder is present can be extracted by the second binarization. A measurement region of 12 μm×9 μm is set in the image second binarized. The area ratio of the region where the binder is present, in the measurement region, is calculated. The area ratio calculated can be estimated in terms of % by volume, and thus the content (% by volume) of the binder in the cubic boron nitride sintered material can be determined. When the second binarization is performed, no variation in content of the void occurs as long as the same field of view is measured.

(E1) The content (% by volume) of the cubic boron nitride grains can be determined by subtracting the content of the void and the content of the binder from the entire cubic boron nitride sintered material (100% by volume).

(A1) to (E1) described above are each performed in ten different measurement regions, and the content (% by volume) of the cubic boron nitride grains, the content (% by volume) of the void and the content (% by volume) of the binder are measured in each of the measurement regions. The average content (% by volume) of the cubic boron nitride grains in the ten measurement regions is defined as the content (% by volume) of the cubic boron nitride grains in the cubic boron nitride sintered material of the present embodiment. The average content (% by volume) of the void in the ten measurement regions is defined as the content (% by volume) of the void in the cubic boron nitride sintered material of the present embodiment. The average content (% by volume) of the binder in the ten measurement regions is defined as the content (% by volume) of the binder in the cubic boron nitride sintered material of the present embodiment.

It has been confirmed that, as long as the measurement is performed in the same sample, measurement results are obtained without substantial variation and there is no arbitrariness even with a measurement region arbitrarily set, even when a location selected in the measurement regions is changed and the measurement is performed for a plurality of times.

<Equivalent Circular Diameter of Void>

The average equivalent circular diameter of the void in the cubic boron nitride sintered material of the present embodiment is preferably no less than 3 nm and no more than 60 nm. This leads to a further enhancement in tool life. The reason for this is presumed as follows: the void present in the cubic boron nitride sintered material is increased in number thereof and the occurrence of cracking is further effectively suppressed.

The lower limit of the equivalent circular diameter of the void is preferably no less than 3 nm, preferably no less than 3.5 nm, preferably no less than 4 nm, preferably no less than 5 nm, preferably no less than 10 nm from the viewpoint of an enhancement in effect of absorbing the difference in thermal expansion coefficient between the cubic boron nitride grains and the binder. The upper limit of the equivalent circular diameter of the void is preferably no more than 60 nm, preferably no more than 55 nm, preferably no more than 50 nm from the viewpoint that the void is increased in number thereof. The equivalent circular diameter of the void is preferably no less than 3 nm and no more than 60 nm, preferably no less than 3 nm and no more than 55 nm, preferably no less than 3 nm and no more than 50 nm, preferably no less than 3.5 nm and no more than 60 nm, preferably no less than 3.5 nm and no more than 55 nm, preferably no less than 3.5 nm and no more than 50 nm, preferably no less than 4 nm and no more than 60 nm, preferably no less than 4 nm and no more than 55 nm, preferably no less than 4 nm and no more than 50 nm, preferably no less than 5 nm and no more than 60 nm, preferably no less than 5 nm and no more than 55 nm, preferably no less than 5 nm and no more than 50 nm, preferably no less than 10 nm and no more than 60 nm, preferably no less than 10 nm and no more than 55 nm, preferably no less than 10 nm and no more than 50 nm.

The equivalent circular diameter of the void herein means the equivalent circular diameter of the void observed in the cross section of the cubic boron nitride sintered material. The equivalent circular diameter of the void is measured according to the following method. First, the same procedures as (A1) to (C1) in the measurement method of the content of the void in the cubic boron nitride sintered material are adopted, and the backscattered electron image and the secondary electron image of the cross section of the cubic boron nitride sintered material are collated to thereby determine the region where the void is present (hereinafter, also referred to as "void region"), in the backscattered electron image, and furthermore the backscattered electron image is first binarized as described above to thereby extract the void region. A measurement region (12 μm×9 μm) is set in the image binarized. The equivalent circular diameter (diameter of an equivalent area circle) in each such void region in the measurement region is calculated with the image processing software. When it is considered based on the shape of each such void region that two or more of such void regions are connected, such void regions are counted as one region and the equivalent circular diameter is calculated. The average equivalent circular diameter of all such void regions in the measurement region is defined as the equivalent circular diameter of the void in the measurement region. The average equivalent circular diameter here means the arithmetic average diameter on a number basis with respect to the equivalent circular diameter. When one void is present in the measurement region, the equivalent circular diameter of such one void is counted as the average equivalent circular diameter. The average equivalent circular diameter is measured in ten different measurement regions. The average of measurement values in the ten measurement regions is defined as the average equivalent circular diameter of the void in the cubic boron nitride sintered material of the present embodiment.

It has been confirmed that, as long as the measurement is performed in the same sample, measurement results are obtained without substantial variation and there is no arbitrariness even with a measurement region arbitrarily set, even when a location selected in the measurement regions is changed and the measurement is performed for a plurality of times.

<Distance Between Voids>

The cubic boron nitride sintered material of the present embodiment includes a plurality of the voids, and the average distance between the voids is preferably no less than 1.5 μm and no more than 15 μm. This leads to a further enhancement in tool life. The reason for this is presumed as follows: the voids exist in a dispersed state in the cubic boron nitride sintered material and the occurrence of cracking is substantially uniformly suppressed in the entire region of the cubic boron nitride sintered material.

The lower limit of the distance between the voids is preferably no less than 1.5 μm, preferably no less than 3 μm, preferably no less than 5 μm from the viewpoint of an enhancement in dispersibility of the voids. The upper limit of the distance between the voids is preferably no more than 15 μm, preferably no more than 14 μm, preferably no more than 13 μm from the viewpoint that the effect of suppressing the occurrence of cracking is obtained. The distance between the voids is preferably no less than 1.5 μm and no more than 15 μm, more preferably no less than 3 μm and no more than 14 μm, further preferably no less than 5 μm and no more than 13 μm.

The distance between the voids is herein measured according to the following method. The same procedures as (A1) to (C1) in the measurement method of the content of the void in the cubic boron nitride sintered material are adopted, and the backscattered electron image and the secondary electron image of the cross section of the cubic boron nitride sintered material are collated to thereby determine the region where the void is present (hereinafter, also referred to as "void region"), in the backscattered electron image, and furthermore the backscattered electron image is first binarized as described above to thereby extract the void region. A measurement region (12 μm×9 μm) is set in the image binarized. The position of the center of gravity in each such void region in the measurement region is derived with the image processing software. The center of gravity coordinate determined is counted as the mother point, and Voronoi tessellation processing is performed to calculate each Voronoi region. The length of the line segment connecting the center of gravity coordinates of the respective mother points of one Voronoi region (hereinafter, first Voronoi region) and a Voronoi region (hereinafter, second Voronoi region) adjacent to the first Voronoi region is calculated. The length of the line segment is defined as the distance between the first Voronoi region and the second Voronoi region. When a plurality of Voronoi regions are adjacent to the first Voronoi region, the first Voronoi region and the plurality of Voronoi regions adjacent thereto are each subjected to measurement of the length of the line segment. All Voronoi regions in a field of view for measurement are subjected to calculation of the length of the line segment between adjacent Voronoi regions in the same manner. The average of the lengths of the line segments between such all Voronoi regions in the field of view for measurement is defined as the average distance between the voids in the measurement region. The average distance between the voids is measured in ten different measurement regions. The average of measurement values in the ten measurement regions is defined as the average distance between the voids in the cubic boron nitride sintered material of the present embodiment.

It has been confirmed that, as long as the measurement is performed in the same sample, measurement results are obtained without substantial variation and there is no arbitrariness even with a measurement region arbitrarily set, even when a location selected in the measurement regions is changed and the measurement is performed for a plurality of times.

<Cubic Boron Nitride Grains>

The cubic boron nitride grains are high in hardness, strength, and toughness, and serve as a backbone in the cubic boron nitride sintered material. The average grain size (D50 in equivalent circular diameter) of the cubic boron nitride grains is preferably no less than 0.4 μm and no more than 10 μm, further preferably no less than 0.5 μm and no more than 6 μm from the viewpoint of an enhancement in tool life.

The average grain size of the cubic boron nitride grains is measured according to the following method. The same procedures as (A1) to (D1) in the measurement method of the content of the cubic boron nitride grains in the cubic boron nitride sintered material are adopted, and the void region and the region where the binder is present (hereinafter, also referred to as "binder region") are extracted in the backscattered electron image and a region obtained by removing the void region and the binder region from the entire region is determined as the region where the cubic boron nitride grains are present (hereinafter, also referred to as "cubic boron nitride grain region"). A measurement region (12 μm×9 μm) is set in the image binarized. The equivalent circular diameter in each such cubic boron nitride grain region in the measurement region is calculated. The average equivalent circular diameter in all cubic boron nitride grain regions in the measurement region is defined as the average grain size of the cubic boron nitride grains in the measurement region. The average equivalent circular diameter here means the median diameter D50 in equivalent circular diameter (equivalent circular diameter at which the frequency accumulation on a number basis is 50%). The average grain size is measured in different ten measurement regions. The average of measurement values in the ten measurement regions is defined as the average grain size of the cubic boron nitride grains in the cubic boron nitride sintered material of the present embodiment.

It has been confirmed that, as long as the measurement is performed in the same sample, measurement results are obtained without substantial variation and there is no arbitrariness even with a measurement region arbitrarily set, even when a location selected in the measurement regions is changed and the measurement is performed for a plurality of times.

<Binder>

The binder serves to allow cubic boron nitride grains corresponding to a difficult-to-sinter material to be sinterable at industrial-level pressure and temperature. The binder is lower in reactivity with iron than cBN, and thus additionally has a function of suppressing chemical wear and thermal wear in cutting of high hardness hardened steel. When a cBN sintered material contains the binder, wear resistance of the cBN sintered material is enhanced when used in high-efficiency processing of high hardness hardened steel.

The binder in the presently disclosed cBN sintered material includes at least one selected from a second group consisting of a material made of a single element selected from a first group consisting of a group 4 element, a group 5 element and a group 6 element of the periodic table, aluminum, silicon, iron, cobalt and nickel, and an alloy and an intermetallic compound each composed of no less than two elements selected from the first group, and/or at least one selected from a fourth group consisting of a compound composed of at least one element selected from the first group and at least one element selected from a third group consisting of nitrogen, carbon, boron and oxygen, and a solid solution of the compound. In other words, the binder can be in any form of the following (a) to (f).

(a) The binder consists of at least one selected from the second group.

(b) The binder includes at least one selected from the second group.

(c) The binder consists of at least one selected from the fourth group.

(d) The binder includes at least one selected from the fourth group.

(e) The binder consists of at least one selected from the second group and at least one selected from the fourth group.

(f) The binder includes at least one selected from the second group and at least one selected from the fourth group.

Examples of the group 4 element of the periodic table include titanium (Ti), zirconium (Zr) and hafnium (Hf). Examples of the group 5 element include vanadium (V), niobium (Nb) and tantalum (Ta). Examples of the group 6 element include chromium (Cr), molybdenum (Mo) and tungsten (W). Hereinafter, any element included in the first group consisting of the group 4 element, the group 5 element, the group 6 element, aluminum, silicon, iron, cobalt and nickel will be also referred to as "first element".

Examples of the alloy of the first element include Ti—Zr, Ti—Hf, Ti—V, Ti—Nb, Ti—Ta, Ti—Cr and Ti—Mo. Examples of the intermetallic compound of the first element include $TiCr_2$, $Ti_3Al$ and Co—Al.

Examples of the compound (nitride) including the first element and nitrogen can include titanium nitride (TiN), zirconium nitride (ZrN), hafnium nitride (HfN), vanadium nitride (VN), niobium nitride (NbN), tantalum nitride (TaN), chromium nitride ($Cr_2N$), molybdenum nitride (MoN), tungsten oxynitride (WN), aluminum nitride (AlN), silicon nitride ($Si_3N_4$), cobalt nitride (CoN), nickel nitride (NiN), titanium zirconium nitride (TiZrN), titanium hafnium nitride (TiHfN), titanium vanadium nitride (TiVN), titanium niobium nitride (TiNbN), titanium tantalum nitride (TiTaN), titanium chromium nitride (TiCrN), titanium molybdenum nitride (TiMoN), titanium tungsten nitride (TiWN), titanium aluminum nitride (TiAlN, $Ti_2AlN$, $Ti_3AlN$), zirconium hafnium nitride (ZrHfN), zirconium hafnium nitride (ZrVN), zirconium niobium nitride (ZrNbN), zirconium tantalum nitride (ZrTaN), zirconium chromium nitride (ZrCrN), zirconium molybdenum nitride (ZrMoN), zirconium tungsten nitride (ZrWN), hafnium vanadium nitride (HfVN), hafnium niobium nitride (HfNbN), hafnium tantalum nitride (HfTaN), hafnium chromium nitride (HfCrN), hafnium molybdenum nitride (HfMoN), hafnium tungsten nitride (HfWN), vanadium niobium nitride (VNbN), vanadium tantalum nitride (VTaN), vanadium chromium nitride (VCrN), vanadium molybdenum nitride (VMoN), vanadium tungsten nitride (VWN), niobium tantalum nitride (NbTaN), niobium chromium nitride (NbCrN), niobium molybdenum nitride (NbMoN), niobium tungsten nitride (NbWN), tantalum chromium nitride (TaCrN), tantalum molybdenum nitride (TaMoN), tantalum tungsten nitride (TaWN), chromium molybdenum nitride (CrMoN), chromium tungsten nitride (CrWN) and molybdenum chromium nitride (MoCrN).

Examples of the compound (carbide) including the first element and carbon can include titanium carbide (TiC), zirconium carbide (ZrC), hafnium carbide (HfC), vanadium carbide (VC), niobium carbide (NbC), tantalum carbide (TaC), chromium carbide ($Cr_3C_2$), molybdenum carbide (MoC), tungsten carbide (WC), silicon carbide (SiC) and tungsten-cobalt carbide ($W_2Co_3C$).

Examples of the compound (boride) including the first element and boron can include titanium boride ($TiB_2$), zirconium boride ($ZrB_2$), hafnium boride ($HfB_2$), vanadium boride ($VB_2$), niobium boride ($NbB_2$), tantalum boride (TaB$_2$), chromium boride (CrB), molybdenum boride (MoB), tungsten boride (WB), aluminum boride (AlB$_2$), cobalt boride (CO$_2$B) and nickel boride (Ni$_2$B).

Examples of the compound (oxide) including the first element and oxygen can include titanium oxide (TiO$_2$), zirconium oxide (ZrO$_2$), hafnium oxide (HfO$_2$), vanadium oxide (V$_2$O$_5$), niobium oxide (Nb$_2$O$_5$), tantalum oxide (Ta$_2$O$_5$), chromium oxide (Cr$_2$O$_3$), molybdenum oxide (MoO$_3$), tungsten oxide (WO$_3$), aluminum oxide (Al$_2$O$_3$), silicon oxide (SiO$_2$), cobalt oxide (CoO) and nickel oxide (NiO).

Examples of the compound (carbonitride) including the first element, carbon and nitrogen can include titanium carbonitride (TiCN), zirconium carbonitride (ZrCN), hafnium carbonitride (HfCN), titanium niobium carbonitride (TiNbCN), titanium zirconium carbonitride (TiZrCN), titanium hafnium carbonitride (TiHfCN), titanium tantalum carbonitride (TiTaCN) and titanium chromium carbonitride (TiCrCN).

Examples of the compound (oxynitride) including the first element, oxygen and nitrogen can include titanium oxynitride (TiON), zirconium oxynitride (ZrON), hafnium oxynitride (HfON), vanadium oxynitride (VON), niobium oxynitride (NbON), tantalum oxynitride (TaON), chromium oxynitride (CrON), molybdenum oxynitride (MoON), tungsten oxynitride (WON), aluminum oxynitride (AlON) and silicon aluminum oxynitride (SiAlON).

The solid solution of the compound means a state where no less than two of such compounds are dissolved in each other's crystal structure, and means an interstitial solid solution or a substitutional solid solution.

The compound may be used singly or in combinations of no less than two kinds thereof.

The lower limit of the total content of the at least one selected from the second group and the at least one selected from the fourth group (hereinafter, "the total content of the second group and the fourth group") in the binder is preferably no less than 50% by volume, more preferably no less than 60% by volume, further preferably no less than 70% by volume. The upper limit of the total content of the second group and the fourth group in the binder is preferably no more than 80% by volume, more preferably no more than 90% by volume, most preferably no more than 100% by volume. The total content of the second group and the fourth group in the binder is preferably no less than 50% by volume and no more than 80% by volume, more preferably no less than 60% by volume and no more than 90% by volume, further preferably no less than 70% by volume and no more than 100% by volume.

The total content of the second group and the fourth group in the binder is measured according to the RIR (Reference Intensity Ratio) method through XRD.

The binder may include other component than the second group and the fourth group. Examples of an element constituting such other component can include manganese (Mn) and rhenium (Re).

The composition of the binder included in the cBN sintered material can be determined through XRD (X-ray Diffraction).

<Applications>

The presently disclosed cubic boron nitride sintered material is suitably applied to cutting tools, wear resistant tools, grinding tools, and the like.

The cutting tool, wear resistant tool and grinding tool using the presently disclosed cubic boron nitride sintered material may be each entirely composed of the cubic boron nitride sintered material or only partially (for example, in a cutting edge portion in the case of the cutting tool) composed of the cubic boron nitride sintered material. A coating film may be formed on a surface of each of such tools.

Examples of the cutting tool can include drills, end mills, indexable cutting inserts for drills, indexable cutting inserts for end mills, indexable cutting inserts for milling, indexable cutting inserts for turning, metal saws, gear cutting tools, reamers, taps, and cutting bites.

Examples of the wear resistant tool can include dies, scribers, scribing wheels, and dressers. Examples of the grinding tool can include grinding stone.

Embodiment 2: Method for Manufacturing Cubic Boron Nitride Sintered Material

The presently disclosed cubic boron nitride sintered material can be produced according to, for example, the following method.

<Raw Material Preparation Step>

First, a cubic boron nitride powder (Hereinafter, also referred to as "cBN powder") and a raw material powder for a binder are prepared.

The cBN powder is a raw material powder for cubic boron nitride grains (Hereinafter, also referred to as "cBN grains") included in the cBN sintered material. The cBN powder is not particularly limited, and a known cBN powder can be used. In particular, the cBN powder is preferably obtained by holding a hexagonal boron nitride powder in the presence of catalytic LiCaBN$_2$ in a range in which cubic boron nitride is thermodynamically stable, and thus converting it into a cubic boron nitride powder.

The D50 (average grain size) of the cBN powder is not particularly limited, and can be, for example, 0.1 to 12.0 μm.

The cBN powder is preferably covered with a binder component. For example, a covering film composed of the binder component, for example, TiN, TiAlN, Al or Al$_2$O$_3$ is preferably on a surface of the cBN powder by sputtering or ion plating. This leads to a reduction in content of the void in the cubic boron nitride sintered material. The reason for this is presumed as follows: the void between the cubic boron nitride grains is easily filled during sintering.

The covering film may be provided on the entire surface of the cBN powder. The covering film may also be provided on at least one portion of the surface of the cBN powder.

The thickness of the covering film is, for example, preferably no less than 0.15 μm and no more than 0.25 m. This leads to a further reduction in content of the void in the cubic boron nitride sintered material. The thickness of the covering film is measured by subjecting the cross section of the powder to SEM-EDX.

The raw material powder for a binder is a raw material powder for a binder included in the cBN sintered material. The raw material powder for a binder can have the same composition as at least one portion of components constituting the binder. The raw material powder for the binder, here used, can be a compound consisting of a material made of a single element selected from the group consisting of a group 4 element, a group 5 element and a group 6 element of the periodic table, aluminum, silicon, cobalt and nickel, or at least one element selected from the group consisting of the element, and nitrogen, carbon, boron and oxygen. For example, the raw material powder for the binder, here used, can be a powder consisting of various compounds described for the binder in Embodiment 1. More specifically, a TiN powder, a ZrN powder, a W$_2$N powder, a VN powder, a Ni powder, a Si$_3$N$_4$ powder, a TiCN powder, a TaN powder, a NbN powder, a Mo$_2$N powder, a HfN powder, a Cr$_2$N powder, or the like can be used. The raw material powder for the binder is not particularly limited, and can be prepared according to a conventionally known method.

<Mixing Step>

Next, the raw material powder for the binder, prepared above, is mixed and pulverized (hereinafter, also referred to as "primary mixing"). The primary mixing method is not particularly limited, and, for example, a ball mill or a jet mill can be used. The mixing and pulverizing methods may be each in a wet manner or a dry manner. The mixing time of the primary mixing can be, for example, no less than 10 hours and no more than 15 hours in the case of a ball mill, and can be, for example, no less than 1 hour and no more than 2 hours in the case of a jet mill.

Next, the raw material powder for the binder, pulverized by the primary mixing, is dispersed in a solvent such as ethanol or acetone, to obtain a dispersion liquid. The cBN powder prepared above is added to and mixed with the dispersion liquid, to obtain a powdery mixture (hereinafter, also referred to as "secondary mixing"). The secondary mixing is not particularly limited, and, for example, a ball mill or a jet mill can be used. The mixing time of the secondary mixing can be, for example, no less than 10 hours and no more than 15 hours in the case of a ball mill, and can be, for example, no less than 1 hour and no more than 2 hours in the case of a jet mill. The solvent is removed by air-drying after the mixing. Thereafter, a heat treatment is performed to volatilize impurities such as moisture adsorbed on the surface of the powdery mixture and thus clean the surface of the powdery mixture.

In a conventional mixing method, a raw material powder for a binder and a cBN powder have been dispersed in and mixed with a solvent from the start. Thus, the mixing time of the cBN powder has been long (for example, no less than 20 hours and no more than 30 hours in the case of a ball mill, and more than 2 hours and no more than 4 hours in the case of a jet mill), and strain has been easily introduced into the cBN powder. The strain in the cBN powder has caused the occurrence of any void in a cubic boron nitride sintered material.

In this regard, the mixing step in the present embodiment includes primary mixing that involves mixing and pulverizing only the raw material powder for the binder, and secondary mixing that involves adding and mixing the cBN powder to and with the dispersion liquid of the raw material powder for the binder after the primary mixing. This leads to a reduction in mixing time of the cBN powder by a ball mill or a jet mill and then a reduction in strain of the cBN powder. Therefore, the content of the void in the cubic boron nitride sintered material is reduced. There has been conventionally the disadvantage of an increase in manufacturing time, and thus there has not been adopted any primary step and any secondary step separately performed in a mixing step. The method involving the mixing step separated to the primary mixing and the secondary mixing, as in the present embodiment, has been newly found by the present inventors.

<Sintering Step>

The powdery mixture is brought into contact with a WC-6% Co cemented carbide disc and a Co (cobalt) foil and thus introduced into a container made of Ta (tantalum), and the container is vacuumed and sealed. A belt-type ultrahigh-pressure and ultrahigh-temperature generator is used and thus the powdery mixture introduced into the container made of Ta is pressurized to a pressure of no less than 5 GPa and no more than 7 GPa and then heated to a temperature of no less than 1300° C. and no more than 1500° C., and held and sintered under pressure and temperature conditions after the pressurizing and heating, for no less than 15 minutes and no more than 30 minutes. The cubic boron nitride sintered material of the present embodiment is thus produced.

The present inventors have newly found that, as the pressure after the pressurizing is lower, the cubic boron nitride sintered material is reduced in content of the void. The reason for this is presumed as follows: a low pressure after the pressurizing hardly causes the cBN powder to be crushed. The present inventors have also newly found that a high temperature after the heating leads to a reduction in content of the void. The reason for this is presumed as follows: a high temperature after the heating results in grain growth. Therefore, the pressure and temperature conditions after the heating and pressurizing can be appropriately adjusted to thereby allow the content of the void in the cubic boron nitride sintered material to be reduced within a desired range.

The sintering step can also be performed by separating each of the heating and pressurizing steps to two stages. Specifically, the powdery mixture introduced into the container made of Ta is pressurized to a primary pressure of no less than 2 GPa and no more than 4 GPa (primary pressurizing), then heated to a primary temperature of no less than 500° C. and no more than 1000° C. (primary heating), and held under pressure and temperature conditions after the heating and pressurizing, for no less than 3 minutes and no more than 30 minutes (primary holding). Subsequently, the powdery mixture is pressurized from the pressure to a secondary pressure of no less than 5 GPa and no more than 7 GPa (secondary pressurizing), then heated to a secondary temperature of no less than 1300° C. and no more than 1500° C. (secondary heating), and held and sintered under pressure and temperature conditions after the pressurizing and heating, for no less than 15 minutes and no more than 30 minutes (secondary holding). The cubic boron nitride sintered material of the present embodiment is thus produced.

The present inventors have newly found that each of the pressurizing and heating steps is separated to two stages to thereby allow the cubic boron nitride sintered material to be reduced in content of the void. The reason for this is presumed as follows: the pressurizing step is separated to two stages to result in a decrease in amount of increase of the pressure applied to the cBN powder in each stage of the primary pressurizing and secondary pressurizing, hardly causing the cBN powder to be crushed. There has been conventionally the disadvantage of an increase in manufacturing time, and thus there has not been adopted any heating and pressurizing steps each separated to two stages.

[Note 1]

The cubic boron nitride sintered material of the present embodiment preferably consists of no less than 30% by volume and no more than 80% by volume of cubic boron nitride grains, no less than 0.01% by volume and no more than 0.20% by volume of a void, and a binder as the balance.

The cubic boron nitride sintered material of the present embodiment preferably consists of no less than 30% by volume and no more than 80% by volume of cubic boron nitride grains, no less than 0.01% by volume and no more than 0.20% by volume of a void, and no less than 19.8% by volume and no more than 69.99% by volume of a binder.

The cubic boron nitride sintered material of the present embodiment preferably consists of no less than 40% by volume and no more than 78% by volume of cubic boron nitride grains, no less than 0.01% by volume and no more than 0.11% by volume of a void, and a binder as the balance.

The cubic boron nitride sintered material of the present embodiment preferably consists of no less than 40% by volume and no more than 78% by volume of cubic boron nitride grains, no less than 0.01% by volume and no more than 0.11% by volume of a void, and no less than 21.89% by volume and no more than 59.99% by volume of a binder.

The cubic boron nitride sintered material of the present embodiment preferably consists of no less than 50% by volume and no more than 75% by volume of cubic boron nitride grains, no less than 0.03% by volume and no more than 0.09% by volume of a void, and a binder as the balance.

The cubic boron nitride sintered material of the present embodiment preferably consists of no less than 50% by volume and no more than 75% by volume of cubic boron nitride grains, no less than 0.03% by volume and no more than 0.09% by volume of a void, and no less than 24.91% by volume and no more than 49.94% by volume of a binder.

EXAMPLES

The present embodiment will be more specifically described with reference to Examples. However, the present embodiment is not limited to these Examples.

Example 1

<Production of Cubic Boron Nitride Sintered Material>

Each cubic boron nitride sintered material of Sample 1 to Sample 36 and Sample 1-1 to Sample 1-3 was produced by the following procedure.

(Raw Material Preparation Step)

First, a cubic boron nitride powder having an average grain size of 3 μm was prepared. A method described in the "Covering film formation method" column in Table 1 was used to form on the cubic boron nitride powder, a covering film having a composition described in the "Composition of covering film" column in Table 1 and a thickness described in the "Thickness [μm]" column in Table 1, and thus each cubic boron nitride powder of Nos. A to I was prepared. For example, the cubic boron nitride powder of No. B was provided with a TiN film having a thickness of 0.1 μm, formed by sputtering.

TABLE 1

| cBN Powder No. | Covering film formation method | Composition of covering film | Thickness [μm] |
|---|---|---|---|
| A | None | — | — |
| B | Sputtering | TiN | 0.1 |
| C | Sputtering | TiAlN | 0.1 |
| D | Sputtering | TiAlN | 0.3 |
| E | Sputtering | Al | 0.1 |
| F | Ion plating | TiN | 0.1 |
| G | Ion plating | TiAlN | 0.1 |
| H | Ion plating | TiAlN | 0.3 |
| I | Ion plating | AlN | 0.1 |

A cubic boron nitride powder (cBN Powder No. corresponded to cBN Powder No. in Table 1) described in the "cBN Powder No." column in Table 2, and a raw material powder for a binder were prepared as raw materials of each of the samples. The raw material powder for a binder, here prepared, was a compound consisting of at least one element selected from the group consisting of a group 4 element, a group 5 element and a group 6 element of the periodic table, aluminum, silicon, cobalt and nickel, and at least one element selected from the group consisting of nitrogen, carbon, boron and oxygen. The compound was used singly or in combinations of no less than two kinds thereof. The average grain size of the raw material powder for a binder was 1 μm.

The amounts of the cBN powder and the raw material powder for a binder, prepared, were respectively percentages so that the content of the cBN grains in the cubic boron nitride sintered material produced was as described in the "cBN Grains [% by volume]" column in Table 3.

TABLE 2

| Sample No. | cBN Powder No. | Mixing method | Primary mixing [hr] | Secondary mixing [hr] | Sintering pressure [GPa] | Sintering temperature [° C.] | Sintering time [min] |
|---|---|---|---|---|---|---|---|
| 1 | A | Ball mill | 12 | 12 | 7 | 1500 | 15 |
| 2 | A | Ball mill | 12 | 12 | 5 | 1300 | 30 |
| 3 | D | Ball mill | 12 | 12 | 5 | 1300 | 15 |
| 4 | H | Ball mill | 12 | 12 | 5 | 1300 | 15 |
| 5 | A | Ball mill | 12 | 12 | 5 | 1300 | 15 |
| 6 | B | Ball mill | 12 | 12 | 5 | 1300 | 15 |
| 7 | C | Ball mill | 12 | 12 | 5 | 1300 | 15 |
| 8 | E | Ball mill | 12 | 12 | 5 | 1300 | 15 |
| 9 | F | Ball mill | 12 | 12 | 5 | 1300 | 15 |
| 10 | G | Ball mill | 12 | 12 | 5 | 1300 | 15 |
| 11 | I | Ball mill | 12 | 12 | 5 | 1300 | 15 |
| 12 | A | Ball mill | 12 | 12 | 7 | 1300 | 15 |
| 13 | A | Ball mill | 12 | 24 | 5 | 1300 | 15 |
| 14 | A | Jet mill | 1 | 1 | 5 | 1300 | 15 |
| 15 | A | Jet mill | 1 | 1 | 5 | 1500 | 15 |
| 16 | A | Jet mill | 1 | 1 | 7 | 1500 | 15 |
| 17 | A | Jet mill | 1 | 1 | 5 | 1300 | 15 |
| 18 | A | Jet mill | 1 | 1 | 5 | 1300 | 15 |
| 19 | A | Jet mill | 1 | 1 | 5 | 1300 | 15 |
| 20 | A | Jet mill | 1 | 1 | 5 | 1300 | 15 |
| 21 | A | Jet mill | 1 | 1 | 5 | 1300 | 15 |
| 22 | A | Jet mill | 1 | 1 | 5 | 1300 | 15 |
| 23 | A | Jet mill | 1 | 1 | 5 | 1300 | 15 |
| 24 | A | Jet mill | 1 | 1 | 5 | 1300 | 15 |
| 25 | A | Jet mill | 1 | 1 | 5 | 1300 | 15 |
| 26 | A | Jet mill | 1 | 1 | 5 | 1300 | 15 |
| 27 | A | Jet mill | 1 | 1 | 5 | 1300 | 15 |
| 28 | A | Jet mill | 1 | 1 | 5 | 1300 | 15 |

TABLE 2-continued

| Sample No. | cBN Powder No. | Mixing method | Primary mixing [hr] | Secondary mixing [hr] | Sintering pressure [GPa] | Sintering temperature [° C.] | Sintering time [min] |
|---|---|---|---|---|---|---|---|
| 29 | A | Jet mill | 1 | 1 | 5 | 1300 | 15 |
| 30 | A | Ball mill | 15 | 15 | 5 | 1300 | 15 |
| 31 | A | Ball mill | 10 | 10 | 5 | 1500 | 15 |
| 32 | A | Ball mill | 15 | 15 | 5 | 1200 | 15 |
| 33 | A | Ball mill | 12 | 12 | 7 | 1300 | 15 |
| 34 | A | Ball mill | 12 | 12 | 5 | 1500 | 30 |
| 35 | A | Ball mill | 12 | 12 | 5 | 1300 | 15 |
| 36 | A | Ball mill | 12 | 12 | 5 | 1300 | 15 |
| 1-1 | A | Ball mill | 0 | 48 | 5 | 1300 | 15 |
| 1-2 | A | Ball mill | 12 | 12 | 5 | 1300 | 15 |
| 1-3 | A | Ball mill | 12 | 12 | 5 | 1300 | 15 |

(Mixing Step)

Next, the raw material powder for a binder, prepared, was mixed and pulverized according to the method described in the "Mixing method" column in Table 2, for a time described in the "Primary mixing [hr]" column in the Table (primary mixing).

Next, the raw material powder for a binder, pulverized through the primary mixing, was dispersed in ethanol, to obtain a dispersion liquid. The cBN powder prepared above was added to the dispersion liquid, and the resulting mixture was mixed according to the method described in the "Mixing method" column in Table 2, for a time described in the "Secondary mixing [hr]" column in the Table, to obtain a powdery mixture ("secondary mixing"). Thereafter, the solvent was removed by air-drying.

For example, in Sample 1, the raw material powder for a binder was mixed and pulverized in a ball mill for 12 hours (primary mixing). Next, the raw material powder for a binder was dispersed in ethanol, to obtain a dispersion liquid, and the cBN powder was added to the dispersion liquid and the resulting mixture was mixed in a ball mill for 12 hours, to obtain a powdery mixture (secondary mixing). Thereafter, the solvent was removed by air-drying.

(Sintering Step)

The powdery mixture was brought into contact with a WC-6% Co cemented carbide disc and a Co (cobalt) foil and thus introduced into a container made of Ta (tantalum), and the container was vacuumed and sealed. A belt-type ultrahigh-pressure and ultrahigh-temperature generator was used and the powdery mixture introduced into the container made of Ta was pressurized to a pressure described in the "Sintering pressure [GPa]" column in Table 2 and then heated to a temperature described in the "Sintering temperature [° C.]" column in the Table, and held and sintered under pressure and temperature conditions after the pressurizing and heating, for a time described in the "Sintering time [min]" column in the Table, to obtain a cubic boron nitride sintered material.

For example, in Sample 1, a belt-type ultrahigh-pressure and ultrahigh-temperature generator was used and the powdery mixture was pressurized to 7 GPa and then heated to 1500° C., and held and sintered at the above pressure and temperature for 15 minutes, to obtain a cubic boron nitride sintered material.

<Evaluation>

The cubic boron nitride sintered material obtained was subjected to measurement of the content (% by volume) of the cubic boron nitride grains, the content (% by volume) of the binder and the content (% by volume) of the void, the composition of the binder, the average equivalent circular diameter of the void, and the average distance between the voids. Specific measurement methods are shown in Embodiment 1, and thus the descriptions thereof are not repeated. The results are shown in the "cBN Grains [% by volume]", "Binder [% by volume]", "Composition of binder", "Void [% by volume]", "Average equivalent circular diameter [nm] of void", and "Distance [μm] between voids" columns in Table 3. The "Balance" in the "Binder [% by volume]" column means that the balance obtained by subtracting the content (% by volume) of the cBN grains and the content (% by volume) of the void from the entire cubic boron nitride sintered material (100% by volume) corresponds to the content of the binder.

TABLE 3

| Sample No. | cBN Grains [% by volume] | Binder [% by volume] | Composition of binder | Void [% by volume] | Average equivalent circular diameter [nm] of void | Average distance [μm] between voids | Cutting test [km] |
|---|---|---|---|---|---|---|---|
| 1 | 70 | Balance | TiN, AlN, TiB$_2$, Al$_2$O$_3$ | 0.01 | 19 | 7.1 | 5.3 |
| 2 | 70 | Balance | TiN, AlN, TiB$_2$, Al$_2$O$_3$ | 0.01 | 32 | 8.1 | 4.9 |
| 3 | 70 | Balance | TiN, AlN, TiB$_2$, Al$_2$O$_3$ | 0.01 | 31 | 4.3 | 4.8 |
| 4 | 70 | Balance | TiN, AlN, TiB$_2$, Al$_2$O$_3$ | 0.01 | 35 | 5.1 | 4.6 |
| 5 | 70 | Balance | TiN, AlN, TiB$_2$, Al$_2$O$_3$ | 0.02 | 43 | 1.8 | 4.1 |
| 6 | 70 | Balance | TiN, AlN, TiB$_2$, Al$_2$O$_3$ | 0.02 | 43 | 1.6 | 4.5 |
| 7 | 70 | Balance | TiN, AlN, TiB$_2$, Al$_2$O$_3$ | 0.02 | 35 | 3.1 | 5.4 |
| 8 | 70 | Balance | TiN, AlN, TiB$_2$, Al$_2$O$_3$ | 0.02 | 41 | 3.2 | 4.9 |
| 9 | 70 | Balance | TiN, AlN, TiB$_2$, Al$_2$O$_3$ | 0.02 | 43 | 3.5 | 4.6 |
| 10 | 70 | Balance | TiN, AlN, TiB$_2$, Al$_2$O$_3$ | 0.02 | 42 | 3.1 | 4.5 |
| 11 | 70 | Balance | TiN, AlN, TiB$_2$, Al$_2$O$_3$ | 0.02 | 40 | 4.1 | 4.5 |
| 12 | 70 | Balance | TiN, AlN, TiB$_2$, Al$_2$O$_3$ | 0.11 | 54 | 1.8 | 4.2 |

TABLE 3-continued

| Sample No. | cBN Grains [% by volume] | Binder [% by volume] | Composition of binder | Void [% by volume] | Average equivalent circular diameter [nm] of void | Average distance [μm] between voids | Cutting test [km] |
|---|---|---|---|---|---|---|---|
| 13 | 70 | Balance | TiN, AlN, TiB$_2$, Al$_2$O$_3$ | 0.20 | 44 | 1.5 | 4.1 |
| 14 | 30 | Balance | TiN, AlN, TiB$_2$, Al$_2$O$_3$ | 0.001 | 3 | 14.8 | 4.1 |
| 15 | 70 | Balance | TiN, AlN, TiB$_2$, Al$_2$O$_3$ | 0.03 | 32 | 3.5 | 6.5 |
| 16 | 70 | Balance | TiN, AlN, TiB$_2$, Al$_2$O$_3$ | 0.03 | 45 | 2.5 | 6.0 |
| 17 | 70 | Balance | ZrN, AlN, Al$_2$O$_3$ | 0.05 | 50 | 2.4 | 5.1 |
| 18 | 70 | Balance | W$_2$N, AlN, Al$_2$O$_3$ | 0.05 | 52 | 2.2 | 5.5 |
| 19 | 70 | Balance | VN, AlN, Al$_2$O$_3$ | 0.05 | 51 | 2.4 | 5.4 |
| 20 | 70 | Balance | TiN, Ni, Al$_2$O$_3$ | 0.05 | 49 | 2.4 | 4.2 |
| 21 | 70 | Balance | TiN, Si$_3$N$_4$, AlN, Al$_2$O$_3$ | 0.05 | 49 | 2.5 | 4.3 |
| 22 | 70 | Balance | TiN, AlN, TiB$_2$, Al$_2$O$_3$ | 0.05 | 49 | 2.3 | 5.9 |
| 23 | 70 | Balance | TiCN, AlN, Al$_2$O$_3$ | 0.05 | 48 | 2.3 | 5.1 |
| 24 | 70 | Balance | TaN, AlN, Al$_2$O$_3$ | 0.05 | 50 | 2.5 | 5.3 |
| 25 | 70 | Balance | NbN, AlN, Al$_2$O$_3$ | 0.05 | 48 | 2.4 | 5.2 |
| 26 | 70 | Balance | Mo$_2$N, AlN, Al$_2$O$_3$ | 0.05 | 51 | 2.3 | 5.4 |
| 27 | 70 | Balance | HfN, AlN, Al$_2$O$_3$ | 0.05 | 48 | 2.5 | 5.6 |
| 28 | 70 | Balance | Cr$_2$N, AlN, Al$_2$O$_3$ | 0.05 | 48 | 2.5 | 5.1 |
| 29 | 80 | Balance | TiN, AlN, TiB$_2$, Al$_2$O$_3$ | 0.08 | 51 | 3.1 | 4.3 |
| 30 | 70 | Balance | TiN, AlN, TiB$_2$, Al$_2$O$_3$ | 0.02 | 60 | 2.2 | 4.8 |
| 31 | 70 | Balance | TiN, AlN, TiB$_2$, Al$_2$O$_3$ | 0.02 | 2 | 12.1 | 4.4 |
| 32 | 70 | Balance | TiN, AlN, TiB$_2$, Al$_2$O$_3$ | 0.02 | 65 | 2.3 | 4.7 |
| 33 | 70 | Balance | TiN, AlN, TiB$_2$, Al$_2$O$_3$ | 0.02 | 40 | 1.2 | 4.3 |
| 34 | 70 | Balance | TiN, AlN, TiB$_2$, Al$_2$O$_3$ | 0.02 | 41 | 14.9 | 4.7 |
| 35 | 40 | Balance | TiN, AlN, TiB$_2$, Al$_2$O$_3$ | 0.02 | 41 | 13.2 | 4.0 |
| 36 | 75 | Balance | TiN, AlN, TiB$_2$, Al$_2$O$_3$ | 0.02 | 42 | 2.3 | 4.1 |
| 1-1 | 70 | Balance | TiN, AlN, TiB$_2$, Al$_2$O$_3$ | 0.22 | 60 | 1.5 | 2.5 |
| 1-2 | 29 | Balance | TiN, AlN, TiB$_2$, Al$_2$O$_3$ | 0.000 | 0 | 0 | 3.1 |
| 1-3 | 81 | Balance | TiN, AlN, TiB$_2$, Al$_2$O$_3$ | 0.11 | 61 | 2.4 | 2.9 |

<Cutting Test>

The cBN sintered material of each sample produced was used to produce a cutting tool (shape of substrate: CNGA120408). The tool was used to perform a cutting test under the following cutting conditions. The following cutting conditions correspond to cutting of a sintered alloy.

Workpiece: carburization material SCM415 (HRC60), round bar of 100 mm diameter
Cutting speed: 150 m/min.
Feed rate: 0.15 mm/rev.
Cutting depth: 0.5 mm
Coolant: WET
Cutting method: outer-diameter continuous cutting
Evaluation method: a cutting distance (km) until fracture is derived. It is indicated that, as the cutting distance is longer, fracture resistance is more excellent and the tool life is longer.

The results are shown in the "Cutting test" column in Table 3.

<Discussion>

The cubic boron nitride sintered materials of Sample 1 to Sample 36 correspond to Examples, and the cubic boron nitride sintered materials of Sample 1-1 to Sample 1-3 correspond to Comparative Examples. It was confirmed that Sample 1 to Sample 36 (Examples) each had a longer tool life than Sample 1-1 to Sample 1-3 (Comparative Examples).

Example 2

<Production of Cubic Boron Nitride Sintered Material>

Each cubic boron nitride sintered material of Sample 50 to Sample 60 was produced by the following procedure.

(Raw Material Preparation Step)

Each cubic boron nitride powder of Nos. A to I and a raw material powder for a binder were prepared according to the same method as in Example 1. The amounts of the cBN powder and the raw material powder for a binder, prepared, were respectively percentages so that the content of the cBN grains in the cubic boron nitride sintered material produced was as described in the "cBN Grains [% by volume]" column in Table 5.

TABLE 4

| Sample No. | cBN Powder No. | Mixing method | Primary mixing [hr] | Secondary mixing [hr] | Primary pressure [GPa] | Primary temperature [° C.] | Primary holding time [min] | Secondary pressure [GPa] | Secondary temperature [° C.] | Secondary holding time [min] |
|---|---|---|---|---|---|---|---|---|---|---|
| 50 | A | Ball mill | 12 | 24 | 3 | 1000 | 15 | 5 | 1300 | 15 |
| 51 | H | Ball mill | 12 | 24 | 3 | 1000 | 15 | 5 | 1300 | 15 |
| 52 | A | Ball mill | 12 | 24 | 3 | 1000 | 15 | 5 | 1300 | 15 |
| 53 | D | Ball mill | 12 | 24 | 3 | 1000 | 15 | 5 | 1300 | 15 |

TABLE 4-continued

| Sample No. | cBN Powder No. | Mixing method | Primary mixing [hr] | Secondary mixing [hr] | Primary pressure [GPa] | Primary temperature [° C.] | Primary holding time [min] | Secondary pressure [GPa] | Secondary temperature [° C.] | Secondary holding time [min] |
|---|---|---|---|---|---|---|---|---|---|---|
| 54 | G | Ball mill | 12 | 24 | 3 | 1000 | 15 | 5 | 1300 | 15 |
| 55 | B | Ball mill | 12 | 24 | 3 | 1000 | 15 | 5 | 1300 | 15 |
| 56 | C | Ball mill | 12 | 24 | 3 | 1000 | 15 | 5 | 1300 | 15 |
| 57 | I | Ball mill | 12 | 24 | 3 | 1000 | 15 | 5 | 1300 | 15 |
| 58 | E | Ball mill | 12 | 24 | 3 | 1000 | 15 | 5 | 1300 | 15 |
| 59 | F | Ball mill | 12 | 24 | 3 | 1000 | 15 | 5 | 1300 | 15 |
| 60 | A | Ball mil | 12 | 24 | 3 | 1000 | 15 | 5 | 1300 | 15 |

(Mixing Step)

Next, the raw material powder for a binder, prepared, was mixed and pulverized according to the method described in the "Mixing method" column in Table 4, for a time described in the "Primary mixing [hr]" column in the Table (primary mixing).

Next, the raw material powder for a binder, pulverized through the primary mixing, was dispersed in ethanol, to obtain a dispersion liquid. The cBN powder prepared above was added to the dispersion liquid, and the resulting mixture was mixed according to the method described in the "Mixing method" column in Table 4, for a time described in the "Secondary mixing [hr]" column in the Table, to obtain a powdery mixture ("secondary mixing"). Thereafter, the solvent was removed by air-drying.

For example, in Sample 50, the raw material powder for a binder was mixed and pulverized in a ball mill for 12 hours (primary mixing). Next, the raw material powder for a binder was dispersed in ethanol, to obtain a dispersion liquid, and the cBN powder was added to the dispersion liquid and the resulting mixture was mixed in a ball mill for 24 hours, to obtain a powdery mixture (secondary mixing). Thereafter, the solvent was removed by air-drying.

(Sintering Step)

The powdery mixture was brought into contact with a WC-6% Co cemented carbide disc and a Co (cobalt) foil and thus introduced into a container made of Ta (tantalum), and the container was vacuumed and sealed. A belt-type ultrahigh-pressure and ultrahigh-temperature generator was used and the powdery mixture introduced into the container made of Ta was pressurized to a pressure described in the "Primary pressure [GPa]" column in Table 4 (primary pressurizing) and then heated to a temperature described in the "Primary temperature [° C.]" column in the Table (primary heating), and held under pressure and temperature conditions after the pressurizing and heating, for a time described in "Primary holding time [min]" column in the Table (primary holding). Subsequently, the powdery mixture was pressurized to a pressure described in the "Secondary pressure [GPa]" column in Table 4 (secondary pressurizing) and then heated to a temperature described in the "Secondary temperature [° C.]" column in the Table (secondary heating), and held under pressure and temperature conditions after the pressurizing and heating, for a time described in the "Secondary holding time [min]" column in the Table (secondary holding), to obtain a cubic boron nitride sintered material.

For example, in Sample 50, a belt-type ultrahigh-pressure and ultrahigh-temperature generator was used and the powdery mixture was pressurized to 3 GPa by using a (primary pressurizing) and then heated to 1000° C. (primary heating) and held at the above pressure and temperature for 15 minutes (primary holding). Subsequently, the powdery mixture was pressurized to 5 GPa (secondary pressurizing) and then heated to 1300° C. (secondary heating) and held at the above pressure and temperature for 15 minutes (secondary holding), to obtain a cubic boron nitride sintered material.

<Evaluation>

The cubic boron nitride sintered material obtained was subjected to measurement of the content (% by volume) of the cubic boron nitride grains, the content (% by volume) of the binder and the content (% by volume) of the void, the composition of the binder, the average equivalent circular diameter of the void, and the average distance between the voids. Specific measurement methods are shown in Embodiment 1, and thus the descriptions thereof are not repeated. The results are shown in the "cBN Grains [% by volume]", "Binder [% by volume]", "Composition of binder", "Void [% by volume]", "Average equivalent circular diameter [nm] of void", and "Average distance [μm] between voids" columns in Table 5. The "Balance" in the "Binder [% by volume]" column means that the balance obtained by subtracting the content (% by volume) of the cBN grains and the content (% by volume) of the void from the entire cubic boron nitride sintered material (100% by volume) corresponds to the content of the binder.

TABLE 5

| Sample No. | cBN Grains [% by volume] | Binder [% by volume] | Composition of binder | Void [% by volume] | Average equivalent circular diameter [nm] of void | Average distance [μm] between voids | Cutting test |
|---|---|---|---|---|---|---|---|
| 50 | 30 | Balance | TiN, AlN, TiB$_2$, Al$_2$O$_3$ | 0.001 | 2 | 55 | 5.1 |
| 51 | 70 | Balance | TiN, AlN, TiB$_2$, Al$_2$O$_3$ | 0.004 | 28 | 5.5 | 5.4 |
| 52 | 80 | Balance | TiN, AlN, TiB$_2$, Al$_2$O$_3$ | 0.004 | 44 | 1.8 | 5.2 |
| 53 | 70 | Balance | TiN, AlN, TiB$_2$, Al$_2$O$_3$ | 0.005 | 29 | 4.8 | 5.4 |
| 54 | 70 | Balance | TiN, AlN, TiB$_2$, Al$_2$O$_3$ | 0.012 | 29 | 3.9 | 5.5 |
| 55 | 70 | Balance | TiN, AlN, TiB$_2$, Al$_2$O$_3$ | 0.015 | 34 | 2.1 | 5.6 |
| 56 | 70 | Balance | TiN, AlN, TiB$_2$, Al$_2$O$_3$ | 0.016 | 31 | 3.6 | 5.7 |
| 57 | 70 | Balance | TiN, AlN, TiB$_2$, Al$_2$O$_3$ | 0.016 | 30 | 5.2 | 5.8 |
| 58 | 70 | Balance | TiN, AlN, TiB$_2$, Al$_2$O$_3$ | 0.018 | 32 | 3.9 | 5.9 |
| 59 | 70 | Balance | TiN, AlN, TiB$_2$, Al$_2$O$_3$ | 0.019 | 31 | 4.1 | 5.7 |
| 60 | 70 | Balance | TiN, AlN, TiB$_2$, Al$_2$O$_3$ | 0.120 | 41 | 2.1 | 5.2 |

<Cutting Test>

The cBN sintered material of each sample produced was used to perform a cutting test under the same conditions as in Example 1. The results are shown in the "Cutting test" column in Table 5.

<Discussion>

The cubic boron nitride sintered materials of Sample 50 to Sample 60 correspond to Examples. It was confirmed that Sample 50 to Sample 60 (Examples) each had a longer tool life than Sample 1-1 to Sample 1-3 (Comparative Examples) produced in Example 1.

While embodiments and Examples of the present disclosure are described as above, configurations of the above embodiments and Examples are expected from the beginning to be appropriately combined and/or variously modified.

The embodiments and Examples here disclosed are illustrative in every respect and should be considered not to be limited. The scope of the present invention is indicated by not the above embodiments and Examples, but claims, and is intended to encompass the meanings equivalent to the claims and all modifications falling within the scope.

REFERENCE SIGNS LIST

1 void, 2 cubic boron nitride grain, 3 binder, 4 cubic boron nitride sintered material

The invention claimed is:

1. A cubic boron nitride sintered material comprising cubic boron nitride grains and a binder, wherein:
    a content of the cubic boron nitride grains in the cubic boron nitride sintered material is no less than 30% by volume and no more than 80% by volume,
    wherein:
    a first group consists of a group 4 element, a group 5 element and a group 6 element of the periodic table, aluminum, silicon, iron, cobalt and nickel;
    a second group consists of a material made of a single element composed of an element selected from the first group, and an alloy and an intermetallic compound each composed of no less than two elements selected from the first group,
    a third group consists of nitrogen, carbon, boron and oxygen, and
    a fourth group consists of a compound composed of one element selected from the first group and at least one element selected from the third group, and a solid solution of the compound, and
    wherein:
    the binder has a form according to one or more of the following (b), (d) and (f):
        (b) the binder includes at least one selected from the second group,
        (d) the binder includes at least one selected from the fourth group,
        (f) the binder includes at least one selected from the second group and at least one selected from the fourth group, and
    the cubic boron nitride sintered material includes a plurality of voids, and a content of the plurality of voids in the cubic boron nitride sintered material is no less than 0.001% by volume and no more than 0.20% by volume, based on measurement in ten regions in the cubic boron nitride sintered material.

2. The cubic boron nitride sintered material according to claim 1, wherein the content of the cubic boron nitride grains in the cubic boron nitride sintered material is no less than 40% by volume and no more than 75% by volume.

3. The cubic boron nitride sintered material according to claim 1, wherein an average equivalent circular diameter of the voids in the plurality of voids is no less than 3 nm and no more than 60 nm.

4. The cubic boron nitride sintered material according to claim 3, wherein the content of the cubic boron nitride grains in the cubic boron nitride sintered material is no less than 40% by volume and no more than 75% by volume.

5. The cubic boron nitride sintered material according to claim 3, wherein
    an average distance between the voids in the plurality of voids is no less than 1.5 μm and no more than 15 μm.

6. The cubic boron nitride sintered material according to claim 1, wherein
    an average distance between the voids in the plurality of voids is no less than 1.5 μm and no more than 15 μm.

7. The cubic boron nitride sintered material according to claim 6, wherein the content of the cubic boron nitride grains in the cubic boron nitride sintered material is no less than 40% by volume and no more than 75% by volume.

* * * * *